US007254604B2

(12) United States Patent
Ueda

(10) Patent No.: US 7,254,604 B2
(45) Date of Patent: Aug. 7, 2007

(54) DISTRIBUTED INFORMATION COLLECTING SYSTEM

(75) Inventor: Tetsuro Ueda, Kanagawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 653 days.

(21) Appl. No.: 10/207,898

(22) Filed: Jul. 31, 2002

(65) Prior Publication Data

US 2003/0028292 A1 Feb. 6, 2003

(30) Foreign Application Priority Data

Aug. 3, 2001 (JP) ............................ 2001-236589

(51) Int. Cl.
*G06F 15/16* (2006.01)

(52) U.S. Cl. ....................... 709/202; 709/205; 340/988

(58) Field of Classification Search ................ 709/202, 709/205; 701/1; 455/456.1; 340/988, 993, 340/995.13

See application file for complete search history.

(56) References Cited

U.S. PATENT DOCUMENTS 5,515,042 A * 5/1996 Nelson ....................... 340/937
6,219,696 B1 * 4/2001 Wynblatt et al. ........... 709/218
6,505,100 B1 * 1/2003 Stuempfle et al. ............. 701/1
6,594,557 B1 * 7/2003 Stefan et al. .................. 701/1
6,804,524 B1 * 10/2004 Vandermeijden ......... 455/456.1
2002/0029278 A1 * 3/2002 Shiouchi et al. ............ 709/229
2002/0150050 A1 * 10/2002 Nathanson .................. 370/241
2002/0156932 A1 * 10/2002 Schneiderman ............. 709/317
2003/0005030 A1 * 1/2003 Sutton et al. ............... 709/200
2003/0018792 A1 * 1/2003 Shiouchi et al. ............ 709/229
2003/0023686 A1 * 1/2003 Beams et al. ............... 709/205

FOREIGN PATENT DOCUMENTS

JP 11-25130 1/1999

* cited by examiner

*Primary Examiner*—Abdullahi Salad
(74) *Attorney, Agent, or Firm*—McDermott Will & Emery LLP

(57) ABSTRACT

A distributed information system includes a communicating section, a control section and a management section. The communication section is to be mounted in a first mobile unit such as a vehicle, to receive an agent program which is an autonomous program to collect information, from a second mobile unit. The control section to be mounted in the first mobile unit performs a control action in response to a request of the agent program sent from the second mobile unit. The management section to be mounted in the first mobile unit is configured to allow delivery of information on a result of the control action to the second mobile unit.

15 Claims, 7 Drawing Sheets

DISTRIBUTED INFORMATION COLLECTING SYSTEM

BACKGROUND OF THE INVENTION

The present invention relates to technique of distributed information system or distributed information collecting and delivering system such as distributed traffic information collecting and delivering system.

A traffic information system, such as a system of Japan Highway Public Corporation (JH), or Nihon Doro Kodan, relies on traffic information collecting stations built at predetermined locations. The traffic information system of such a centralized type is insufficient in that the number of traffic monitoring positions is limited, and that the method of accessing traffic information is limited.

A Published Japanese Patent Application Publication (Kokai) No. H11(1999)-25130 discloses a traffic information collecting system utilizing a plurality of probe cars functioning as a traffic information monitoring apparatus and supplying traffic information to a server. Traffic information is collected dynamically by a great number of probe cars. This system is a kind of a distributed information system capable of collecting information widely and flexibly without resorting too much to infrastructure.

SUMMARY OF THE INVENTION

In the system of probe cars, however, the burden on a central traffic information server is still heavy because a great number of requests for traffic information converge to the central server. Second, the communication traffic as a whole is increased by the need for periodic report from each probe car to the central server to update the traffic information. Third, a search for traffic information by a user is complicated and troublesome in many cases because the search must be conducted through an enormous amount of data in the server, notwithstanding required information being limited to information along a predetermined course such as the time required to reach a destination and information on accident, for example.

It is an object of the present invention to provide distributed information collecting system and/or method adequate for restraining an increase in communication traffic as a whole and facilitating search for information.

According to one aspect of the present invention, a distributed information system comprises: a communication section to be mounted in a first mobile unit, to receive an agent program which is an autonomous program to collect information, from a second mobile unit; a control section to be mounted in the first mobile unit, to perform a control action in response to a request of the agent program sent from the second mobile unit; and a management section to be mounted in the first mobile unit, to allow delivery of information on a result of the control action to the second mobile unit.

According to another aspect of the present invention, a distributed information collecting and delivering system comprises: a server-side communicating section to accepting agent programs which are autonomous programs, from a plurality of mobile units; and a server-side mediating section providing a virtual space on which the agent programs interact with each other.

According to still another aspect of the present invention, a vehicle for serving as a mobile station for a distributed information collecting and delivering system, comprises: means for receiving a visiting agent program which is an autonomous program, across a communication network; means for preparing information in response to a request of the visiting agent program; and means for allowing the visiting agent program to deliver the information to a destination specified by the visiting agent program across the communication network.

According to still another aspect of the present invention, a distributed information collecting and delivering process comprises: receiving a visiting agent program which is an autonomous program, from a remote mobile unit across a communication network; allowing the visiting agent program to operate to obtain information for the remote mobile unit; and allowing the visiting agent program to deliver the information to a destination specified by the visiting agent program across the communication network.

The other objects and features of this invention will become understood from the following description with reference to the accompanying drawings.

DETAILED DESCRIPTION OF THE INVENTION

Figure 1:
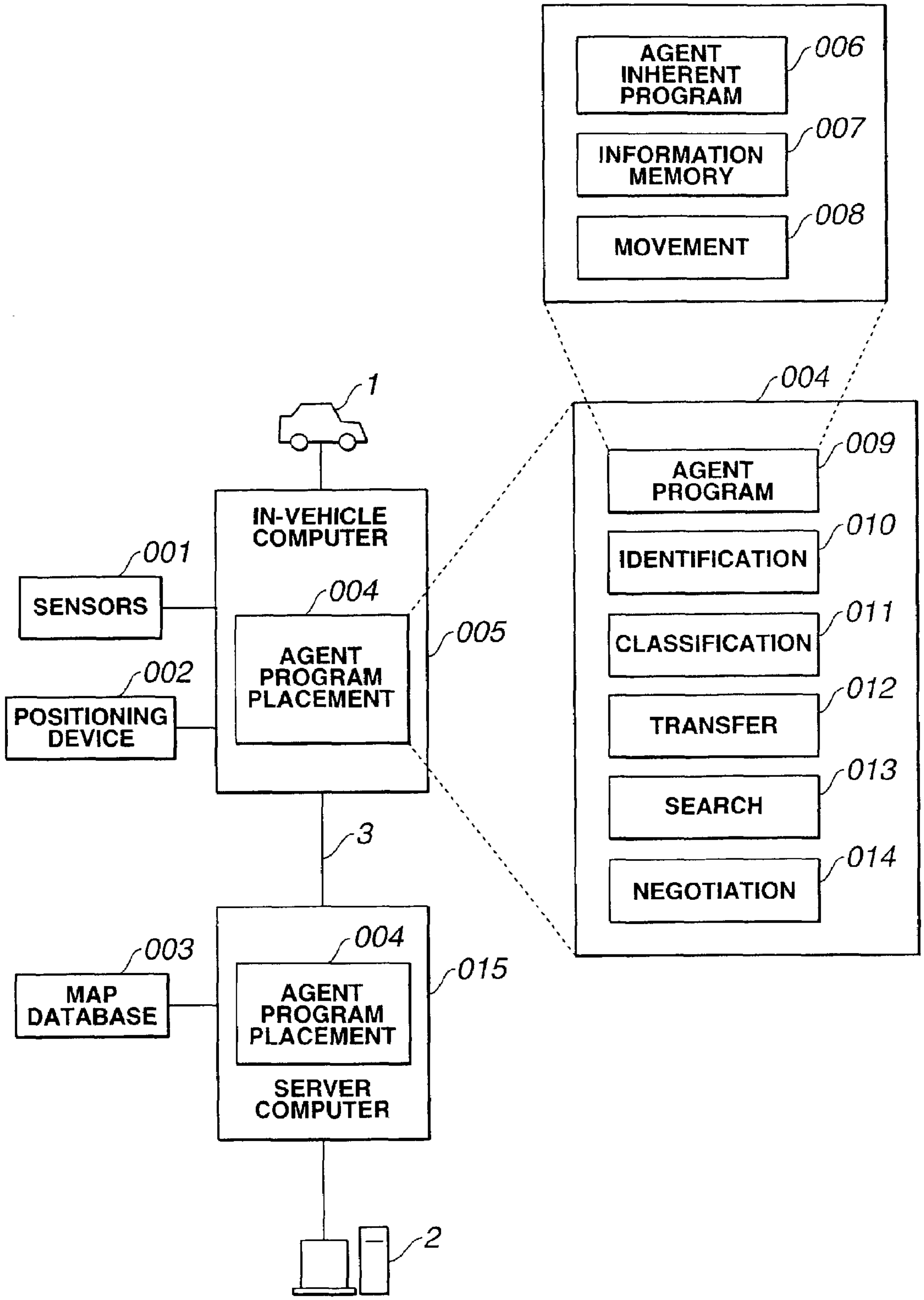
FIG. 1 is a block diagram showing a distributed information system according to a first embodiment of the present invention.

FIG. 1 shows a distributed information collecting and delivering system according to a first embodiment of the present invention. The distributed information collecting and delivering system of this embodiment is for collecting and delivering traffic information among vehicles (mobiles or mobile units).

A vehicle 1 shown in FIG. 1 includes a sensor group 001 for sensing a vehicle speed and other vehicle operating conditions of the vehicle, a positioning device 002 for determining a current vehicle location, and an in-vehicle (onboard) computer 005. In this example, positioning device 002 determines the vehicle location by the use of GPS (Global Positioning System). An agent program placement section 004 is formed as a function of computer 005. The contents of agent program placement section 004 includes an agent program 009, an identification section 010, a classification section 011, a transfer section 012, a search section 013 and a negotiating section 014. Agent program 009 includes an agent inherent program 006, an informatio n memory 007 and a movement section 008, as explained below.

A ground station (or server) 2 includes a map database 003 and a server computer 015. An agent program placement section 004 is formed as a function of computer 015. The contents of this agent program placement section 004 is substantially identical to the contents of agent program placement section 004 of in-vehicle computer 005 of vehicle 1.

A communication system 3 is a wireless or radio communication network for enabling exchange of information between vehicle (mobile station) 1 and ground station 2 or among vehicles.

Figure 2:
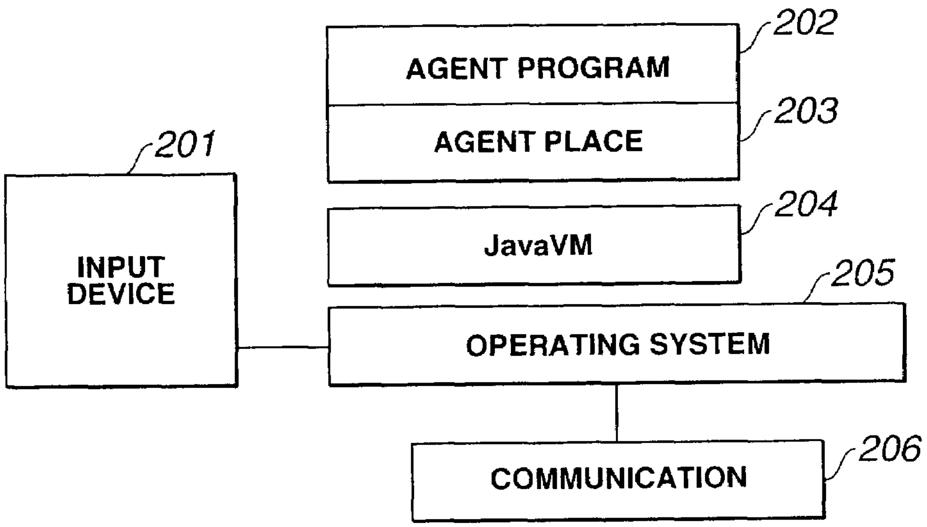
FIG. 2 is a block diagram showing the contents of an in-vehicle computer shown in FIG. 1.

FIG. 2 shows the contents of in-vehicle computer 005 of vehicle 1 in the form of a block diagram. Sections shown in FIG. 2 correspond to the blocks in agent program placement section 004 shown in FIG. 1. An operating system 205 such as Windows CE (registered trademark) or ITRON (registered trademark) is installed on the computer. Operating system 205 provides a software platform on which one or more application programs can run. On operating system 205, there is formed an agent place 203 for enabling placement and operation of an agent or agents.

Agent place 203 is written in network-adapted language or platform-independent language, such as Java (registered trademark). In the case of Java, the system requires, as a prior condition, JavaVM (registered trademark) 204. On agent place 203, there is placed an agent program 202 or agent programs 202 for respective objectives. In this example, agent program 202 is written in Java, and loaded dynamically on agent place 203 for operation.

Figure 3:
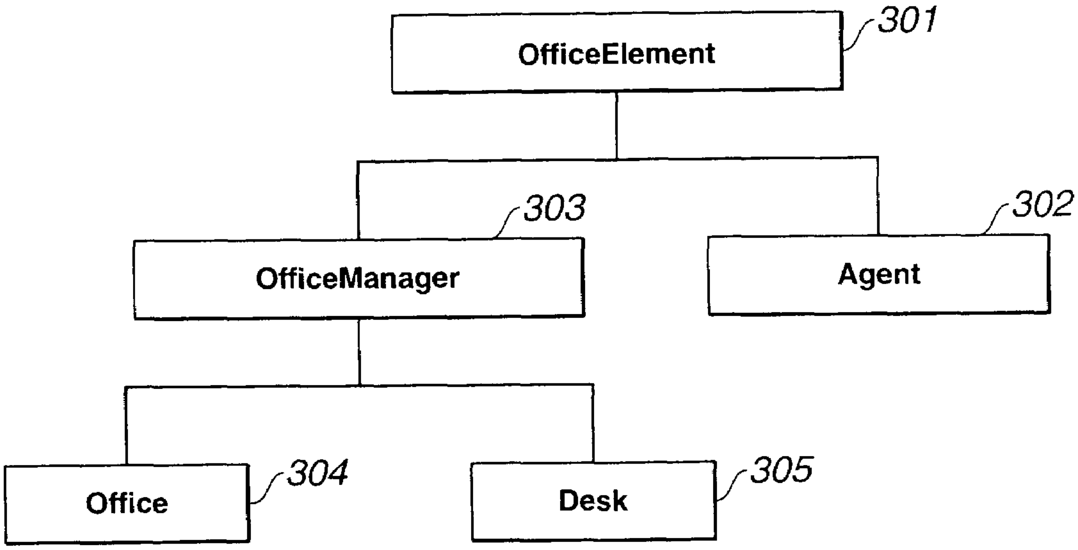
FIG. 3 is a view showing the structure of an agent place 203 shown in FIG. 2.

Agent program 202 and agent place 203 in this example are configured as shown in FIG. 3, like a real human agent. In FIG. 3, on the assumption that an agent is working at an office, an element in the office is defined as OfficeElement 301. For example, OfficeElement 301 has a name, and is disposed in the office. An OfficeManager 303 is defined as a derivative from OfficeElement 301. OfficeElement 301 can be placed on OfficeManager 303. OfficeManager 303 holds a list of OfficeElement or OfficeElements 301, and manages message communication among OfficeElements 301, and generation and extinction.

An Office 304 is defined as a derivative from OfficeManager 303. Office 304 is an agent place opened to the network. OfficeElement 301 is registered in Office 304 as an element of Office 304. The network enables the exchange of OfficeElements across the network.

Office 304 has a unique ID for identification on the network. On the network based on TCP/IP, the ID of Office 304 is in the form of a set of IP address and access protocol to the Office. For example, the ID of Office having an IP address of 192.168.0.1 accessible by RMI is:

rmi://192.168.0.1/

When access is by HTTP, the ID of Office is:

http://192.168.0.1/

Desk 305 is another derivative from OfficeManager 303. Desk 305 is provided to classify OfficeElements. In an example of an Office (TravelOffice) for traveling, Desk 305 has therein FrightDesk for plane reservation and HotelDesk for hotel reservation, for allotment of services. Desk 305 has a unique name in the Office, and is expressed, in combination with the before-mentioned Office ID, as:

rmi://192.168.0.1/Desk1/Desk2 This indicates Desk 2 which exists in a Desk named Desk 1 in RMI-accessible Office having an IP address 192.168.0.1.

An Agent 302 is defined as a derivative from OfficeElement 301. This Agent 302 is an actual entity of agent program 202. Agent 302 is placed on Desk 305. Agent 302 provides services by interacting and negotiating with a visiting agent from the outside. Agent 302 too has a unique name in the Office. Accordingly, Agent 302 is identified, by combination with the ID of the Office and the name of Desk, as:

rmi://192.168.0.1/Desk1/Desk2/AgentName

This is an ID specifying an Agent named AgentName existing in Desk2 in Desk1 in RMI-accessible Office having an IP address 192.168.0.1. This portion corresponds to identifying section 010.

These elements are preliminarily installed in the computer of each vehicle, and what is actually exchanged among agent places is only a part of its own definition derived from Agent 302. When, for example, FlightAgent is specifically defined for servicing flight information, only the difference between FlightAgent and Agent is transferred actually. Agent 302 per se is already provided in the agent place on the other side. Thus, this system cam reduce the amount of data to be actually transmitted.

In-vehicle computer (corresponding to item 005 shown in FIG. 1) is connected with the network through a wireless communicating device 206 shown in FIG. 2. The network may be the Internet or may be a special information server. With an operating board or input device 201 connected with the in-vehicle computer, a user (a driver of the vehicle, for example) can create an agent program 202, and transfer agent program 202 with communication device 206 to a road traffic information server (corresponding to item 015 shown in FIG. 1). When, for example, the user wishes to gather traffic information along a planned route, agent program 202 moves to a vehicle running along a road on the route, and collects desired traffic information on behalf of the user. In this case, the user or driver first creates a traffic information agent (that is, an agent program for traffic information) on the computer in the vehicle of the user. (Hereinafter, an agent program is referred to simply as an agent.)

Traffic information agent can assume one of the following three states: (1) CONCIERGE; (2) AGENT; and (3) RETIREMENT. CONCIEGE represents a first state in which an agent is created in a computer of a vehicle (home vehicle), and not yet moved out of the computer of the vehicle. AGENT represents a state in which the agent is moved from the computer of the home vehicle at which the agent is created, to the computer of another vehicle. RETIREMENT represents a state in which the agent is returned to the home vehicle to which the agent currently belongs.

Discrimination is made among these states by checking which one of the following three information items the agent holds. (1) HomeDesk, (2) PreviousDesk and (3) CurrentDesk. HomeDesk is the ID of a Desk at which the agent is created. HomeDesk remains unchanged until the agent ceases to exist. One example of HomeDesk is:

rmi://192.168.0.1./Desk1/Desk2/

PreviousDesk is the ID of a Desk to which the agent has belonged most recently and does not belong any more. CurrentDesk is the ID of a Desk to which the agent currently belongs. Before the current Desk is set as CurrentDesk, CurrentDesk is copied to PreviousDesk.

Judgment is made about these three states in the following manner. (1) When PreviousDesk=NULL && CurrentDesk=HomeDesk, then the judgment is CONCIERGE. (2) When PreviousDesk!=CurrentDesk &&

CurrentDesk=HomeDesk, then the judgment is AGENT. (3) When PreviousDesk!=CurrentDesk && CurrentDesk=HomeDesk, then the judgment is RETIREMENT.

Agent discriminates among these three state by itself, and thereby decides what to do when the agent arrives at a Desk. For example, the before-mentioned traffic information agent, when in CONCIERGE state, obtains information of the home vehicle about the current vehicle position, destination, planned course, and time, from computer resources in the home vehicle. Thereafter, the traffic information agent moves to the traffic information server (ground station, for example). When the traffic agent reaches the traffic information server, the traffic information agent turns to the AGENT state. In the AGENT state, the agent acts to the Desk where the agent resides, and performs operations in dependence on a response of the Desk.

In the traffic information server, the traffic agent is placed in a two-dimensional virtual space in Desk in accordance with coordinates of the current position of the home vehicle which is the vehicle at which the traffic information is created. Then, a conceivable route is calculated in accordance with the information on the destination and roads to use on the plan. Then, a search is conducted for another traffic information agent located on the calculated route. That is, the traffic information agent requesting traffic information searches for another traffic information agent, or traffic information delivering agent, competent to supply requested traffic information. This search for a pertinent agent possessing desired information corresponds to searching section 013 shown in FIG. 1. The traffic information collecting agent thus determines the location of the pertinent traffic information delivering agent.

To move directly to the searched-out information delivering agent, the traffic information collecting agent checks HomeDesk of the information delivering agent. If a plurality of competent information delivering agents are found on the route in the virtual map space on Desk of the traffic information server, the information collecting agent creates clones of itself to the number corresponding to the number of the found-out information delivering agents, and each moves to the location of HomeDesk indicated by a unique one of the information delivering agents. The movement of the agent is carried out by agent place 203. This portion corresponds to the movement section 008 shown in FIG. 1.

Agent place 203 opens a telecommunication line, and starts a session on TCP/IP. Communication on TCP/IP with a remote server can be performed in various ways. For example, it is possible to transfer an agent in the form of argument of method invocation of a remote server, by the use of Java RMI, which is the smartest way in Java technology. Normally, RMI cannot enable movement across a firewall, however. Therefore, the transfer of an agent over the Internet requires other methods. When, for example, a remote server is composed of Java Servlet, the transfer of an agent is feasible with HTTP. As another example, it is possible to transfer an agent with a configuration of a socket server. In any case, an agent is serialized before being sent into the network, and restored from the serialized form after being read out on the recipient side An interface called Exportable is installed for abstraction of these operations. In Exportable, there is provided method Visit for transfer of an agent. Various implementations with this interface enable transportation of an agent by Visit method. With this configuration, the sender of the agent can invoke Visit method and thereby transfer the agent to an object having Exportable interface without regard to its communication protocol. In the before-mentioned example, there are, as implementation of Exportable interface, RMI server of Java, communication with Servlet of Java, and communication with socket server with special protocol.

Figure 4:
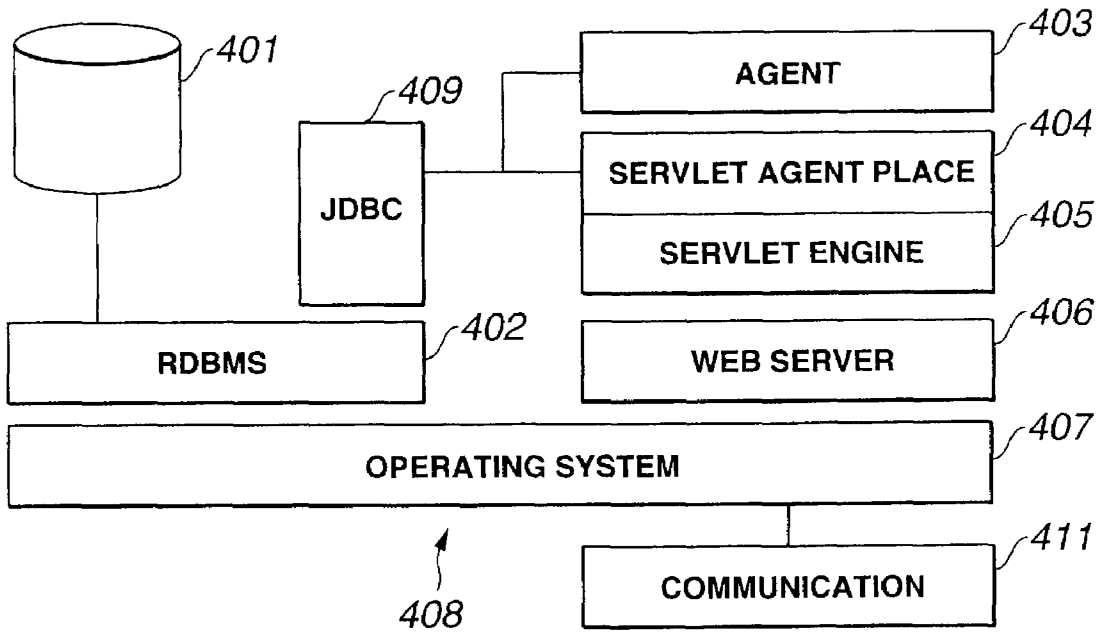
FIG. 4 is a block diagram showing the structure of a traffic information server shown in FIG. 1.

FIG. 4 shows the configuration of the traffic information server (corresponding to item 015 shown in FIG. 1) in this example. The traffic information server of this example holds no individual traffic information, and merely provides a place for registration of traffic information agents. In the following example, the traffic information server is configured by Servlet of Java.

A computer 408 is prepared as traffic information server, and connected with the network. Computer 408 of this example is a DOS/V computer or a computer that is run by an Intel (or Intel-compatible) processor. An operating system 407, such as Linux, Unix or Windows (Windows 2000 or Windows XP), is installed on computer 408. A Web server 406 such as Apache is mounted as application on operating system 407, to meet HTTP requests from the outside.

Web server 406 such as Apache is integrated and compiled with a Servlet engine such as ApacheJserv, to build a Servlet-adapted Web server. An agent place 404 is written as Servlet on Servlet engine 405, so that agent place 404 can run on Servlet engine 405.

Traffic information server 408 contains a relational database (RDBMS) 402 for storing agents sent to the server. RDBMS 402 such as Oracle, Sybase or Postgre SQL is operable on operating system 407. JDBC 409 corresponding to relational database 402 is also installed to enable transaction between RDBMS 402 and Servlet. Relational database 402 holds information on the position of each agent inclusive of longitude and latitude. When viewed from a different angle, therefore, relational database 402 is a virtual space in which agents are placed.

Agent place 404 performs the following operations when an agent is transferred to Servlet on the traffic information server.

First, in response to a call from a client (an information requesting client who wants to collect information), a process starts with creation of a thread of Servlet on an agent receiving side. This thread immediately opens an input stream, takes out a serialized agent from the input stream and restores the agent into the original form.

Agent 403, when transferred, has a designation of Desk as destination address. In the example of rmi://192.168.0.1/Desk1/Desk2/

Desk1/Desk2 is the ID of Desk on this Office. Agent place 404 extracts the ID of Desk from the destination address, and places the deserialized agent at the destination Desk.

Then, a query is posed to RDBMS 402, to find a next destination. When, for example, the requested information is traffic information, the query asks for IP addresses of agents having information on the same destination or road en route, or an agent located near the area about which information is requested, or in a predetermined area. If a plurality of IP addresses are obtained as the result of the query, the agent produces clones of itself to the number corresponding to the number of the found-out IP addresses, and sends the agent or a clone to each of the IP addresses.

The information delivering side is configured in the following manner.

The information delivering side is basically identical to the information collecting side shown in FIG. 2. An agent having information on the position, destination and roads en route of the information delivering side is transferred in advance to the traffic information server. The agent of the delivering side shows the way to the agent place of its own, the information collecting agent. Namely, a vehicle starts functioning as an information delivering mobile station or vehicle, by lauching its own agent to the traffic information server.

When the information collecting agent arrives at the agent place 203 on the information delivering side, the following operations are performed. In this example, agent place 203 is build as RMI server.

Agent place 203 of the information deliverer starts up a Remiregistry that is a RMI server, and registers its own name. The collector invokes a Visit method that is an object registered in the RMI server, and transmits its argument packed with object of agent program. The deliverer receives the agent program object of the argument directly, and registers it in its own agent place 203.

The collector agent (that is the agent program launched by the information collector) at agent place 203 of the deliverer performs the following operations.

The collector agent confirms the current position and traveling direction of the deliverer, and checks whether they are in agreement with the requested position and direction. In the case of agreement, the collector agent continues to stay there, and performs operations to deliver information. The collector agent returns automatically to the traffic information server in the case of disagreement, or if the traveling direction deviates en route or communication of traffic information is suspended because of long stay. During the stay, information is delivered by sending messages directly to the agent place of the collector or another agent existing in the agent place.

The collector agent performs operations by itself with a built-in program. As a basic operation, for example, the collector agent is programmed to inform the collector of the current average vehicle speed by reporting periodically with a built-in timer, or by reporting only if the average vehicle speed is varied to some degree. By so doing, the collector agent enables the detection of a start and an end of traffic congestion.

Since the average speed is checked and stored periodically, the agent can retain the information even if the communication is interrupted, and transmits the information when the communication is reopened. Thus, the collector can collect information in a stable manner without regard to the connection state of the communication.

In addition to collection of information by access to system resources of the deliverer side such as the speed measurement, the collector agent in the agent place of the deliverer can interact with another collector agent visiting the deliverer agent place. If, for example, a second visiting collector agent is from the destination of ta first collector, the first collector can obtain information directly from the second collector agent without intervention of the traffic information server, or register the second collector agent as a next destination.

The information the agent has is what is called individuality of the agent. The information includes weather information oh the route, average speed, and preference of a driver or owner of the agent. The information on the average vehicle speed is helpful to know the estimate of road traffic in an unmonitored region, and to get a hint for route selection. When it is proved that the preference of the driver about vehicles is the same, the traffic information agent can call a chat agent and begins a chat about cars. Thus, agents can negotiate with one another. This portion corresponds to negotiating section 014 shown in FIG. 1. There is a need for standardization of description about individuality of agents. The vocabulary of XML is used for description.

The information collector and deliverer are not always separate. A vehicle may serve as an information collector on one hand and simultaneously serve as an information deliverer on the other hand.

Figure 5A:
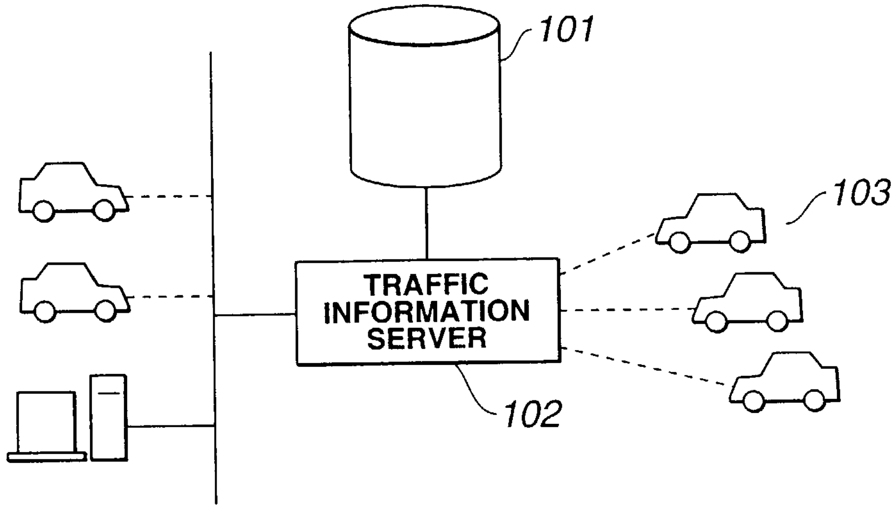
FIGS. 5A and 5B are schematic views for illustrating a distributed information system of earlier technology and the distributed information system according to the first embodiment of the present invention.
Figure 5B:
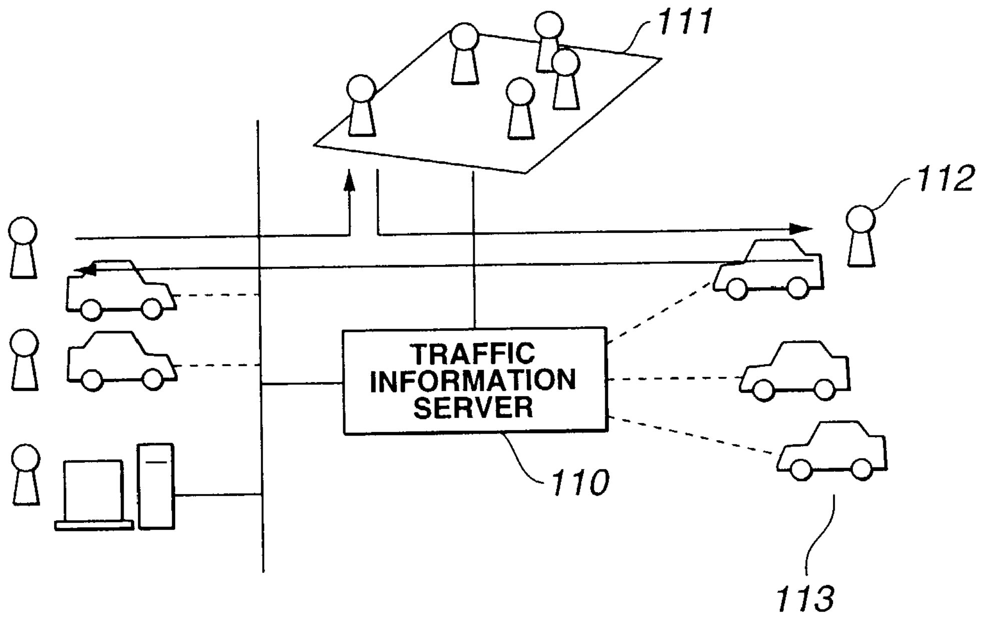

For comparison, FIGS. 5A and 5B show, respectively, the configuration of a distributed traffic information collecting system of an earlier technology and the configuration of the distributed traffic information collecting system according to the first embodiment of the present invention.

In the distributed information collecting system of FIG. 5A, all the traffic information is transmitted from each probe car 103 to a traffic information server 102 and stored in a database 101 of traffic information server 102. To retrieve a required piece of information, each probe car 103 must search through all the enormous amount of data stored in database 101. Therefore, the amount of information to be handled is increased, and the burden on traffic information server 102 is heavy. Moreover, each probe car 103 must communicate with the traffic information server with a predetermined frequency, and hence the communication traffic increases as a whole. To obtain required information, it is necessary to search the enormous amount of data. Thus, the distributed information collecting system of FIG. 5A is distributed in the peripheral end, but this system is centralized in that information is accumulated in the server system. With this bottleneck, the system of FIG. 5A is insufficient as a distributed system. From the viewpoint of an information collector, this system holds a great amount of useless information in the traffic information server, impeding the collector's search for required information. From the viewpoint of an information deliverer, this system requires useless communication to deliver information continuously whether requested or not.

In the distributed system according to this embodiment as shown in FIG. 5B, by contrast, traffic information server 110 serves merely as a go-between providing virtual space 111 for agent programs 112. Actual information delivering and collecting are carried out directly between probe cars 113. The system of FIG. 5B has a configuration of distributed information collection and distributed information delivering in which a collector receives required information directly from a competent deliverer. This system eliminates the need for storing an enormous amount of data in, traffic information server 110, the need for periodic communication between each probe car and server and the need for retrieving required data from the enormous amount of data.

A distributed information system according to a second embodiment of the present invention utilizes a chat agent (an agent program for chatting).

In the chat agent of this embodiment, the agent place and agent server are the same in configuration as those in the first embodiment. Chat agent is an agent program which moves directly to an agent place of a chat companion and provide an interface for chatting to the companion.

While, for example, vehicles A and B are running toward respective destinations, vehicle A creates a chat agent in an agent place of its own, duplicates the chat agent, and transfers the chat agent to a chat server (as explained later). In this case, the chat agent has a kind of topic and destination. The transferred chat agent turns to the before-mentioned AGENT state, and talks to another agent on the chat server.

In this embodiment, the chat agent talks to another agent already located at the destination on the virtual space, or another agent heading for the same destination. If a companion agent is ready to accept an offer of chat, the companion agent transfers the chat agent directly to an agent place of HomeDesk to which the companion agent has belonged. If there are a plurality of acceptant agents, clones are produced and transferred, respectively, to the home places of the acceptant agents.

The chat agent transferred to an agent place on a vehicle is in the AGENT state as in the chart server, and talks to the agent place. To talk means to present a dialog as to whether to present an interface for chatting. If the driver considers it possible to start a chat and presses an OK button in the dialog, then the chat interface opens and enables chatting with the chat agent in its own HomeDesk. In this way, this system enables a chat helpful to the vehicle operation by passing a chat agent through the chat server to vehicle or vehicles adequate for the intended purpose.

Unlike a client/server type chat server, the chat server according to this embodiment has, in its charge, only entry and transfer of a chat agent. The actual function of chat server is performed by the sender side sending the chat agent. With this configuration, it is possible to tailor a plurality of computers about chat topic as a primary chat server. When, for example, vehicles A and B feel an affinity for each other about a topic, vehicle B can allow a vehicle C to enter the chat space and join in the topic, by transferring a clone of the chat agent to vehicle C without regard to intention of vehicle A who is the sender of this chat agent. In this case, the chat agents obtain the respective positions from the positioning devices such as a car navigation system, and send the information on the position attached to chat messages.

When the agent place to which a chat agent belongs has a map display device such as a display of a car navigation system, it is possible to produce a mark at the position of the chat companion on the map display. When setting is such that a chat agent can talk only to a specified companion, the driver can drive the car while chatting and checking the position of the companion until both meet at the same destination. In this way, the system according to the second embodiment enables a chat conformable to vehicle driving situation only with a chat agent without the need for a centralized chat server.

Figure 6:
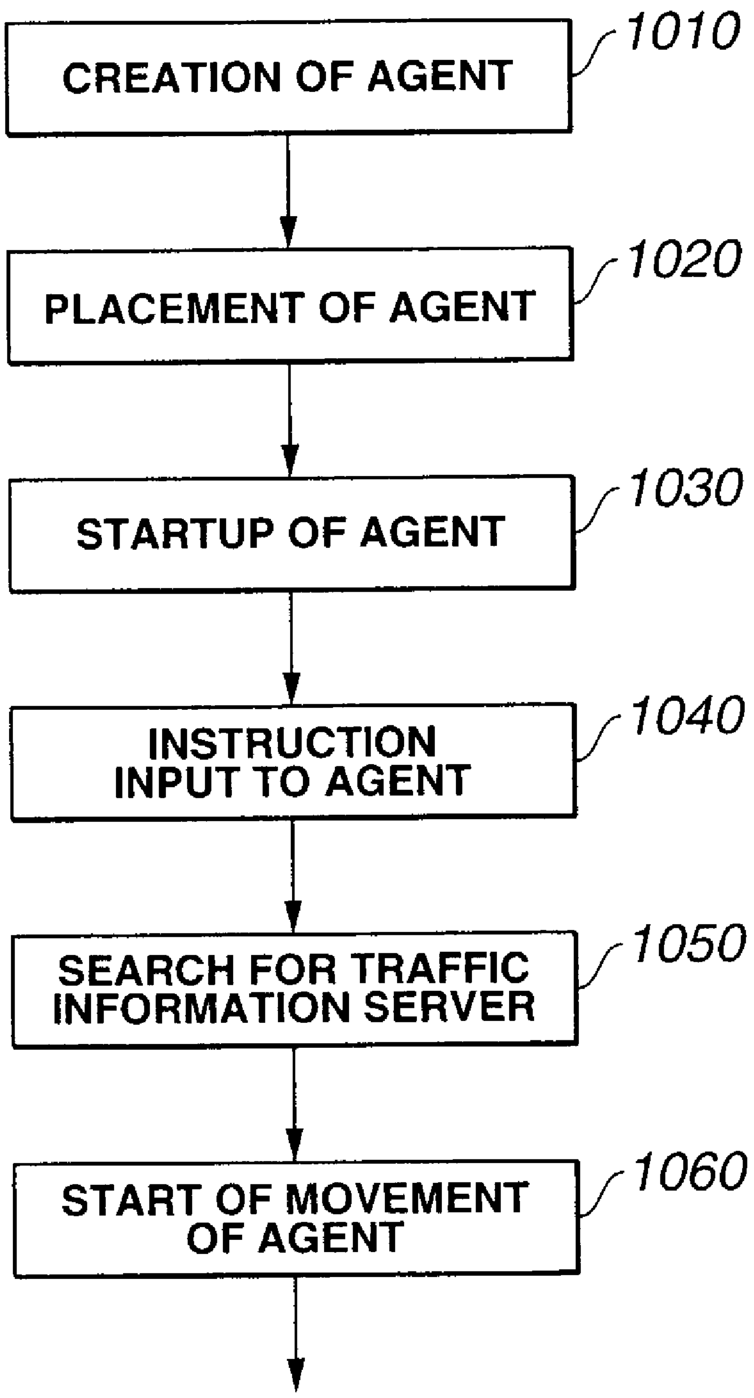
FIG. 6 is a flowchart showing a flow in the system of the embodiment according to the present invention at a home place where an agent is created.
Figure 7:
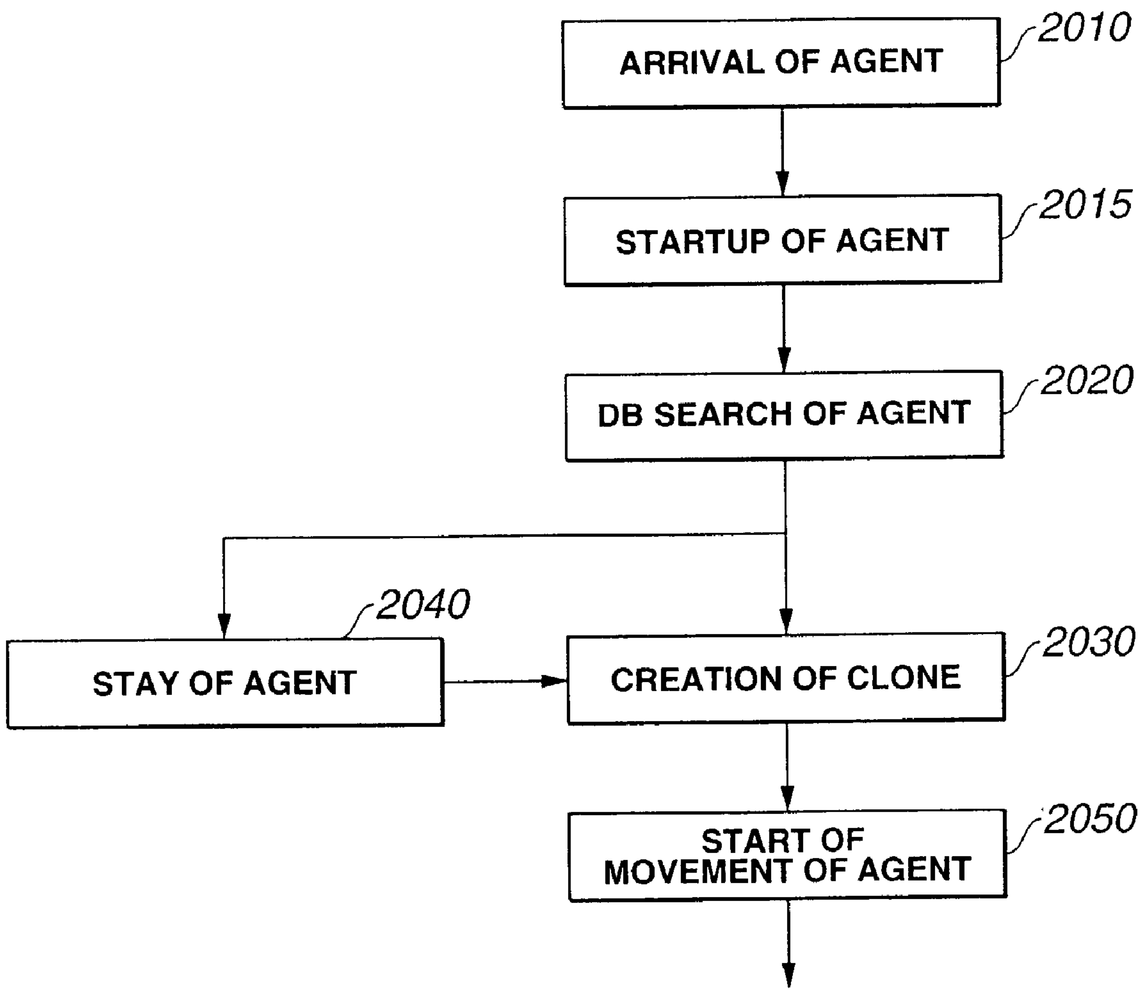
FIG. 7 is a flowchart showing a flow in the system of the embodiment according to the present invention at a traffic information server.
Figure 8:
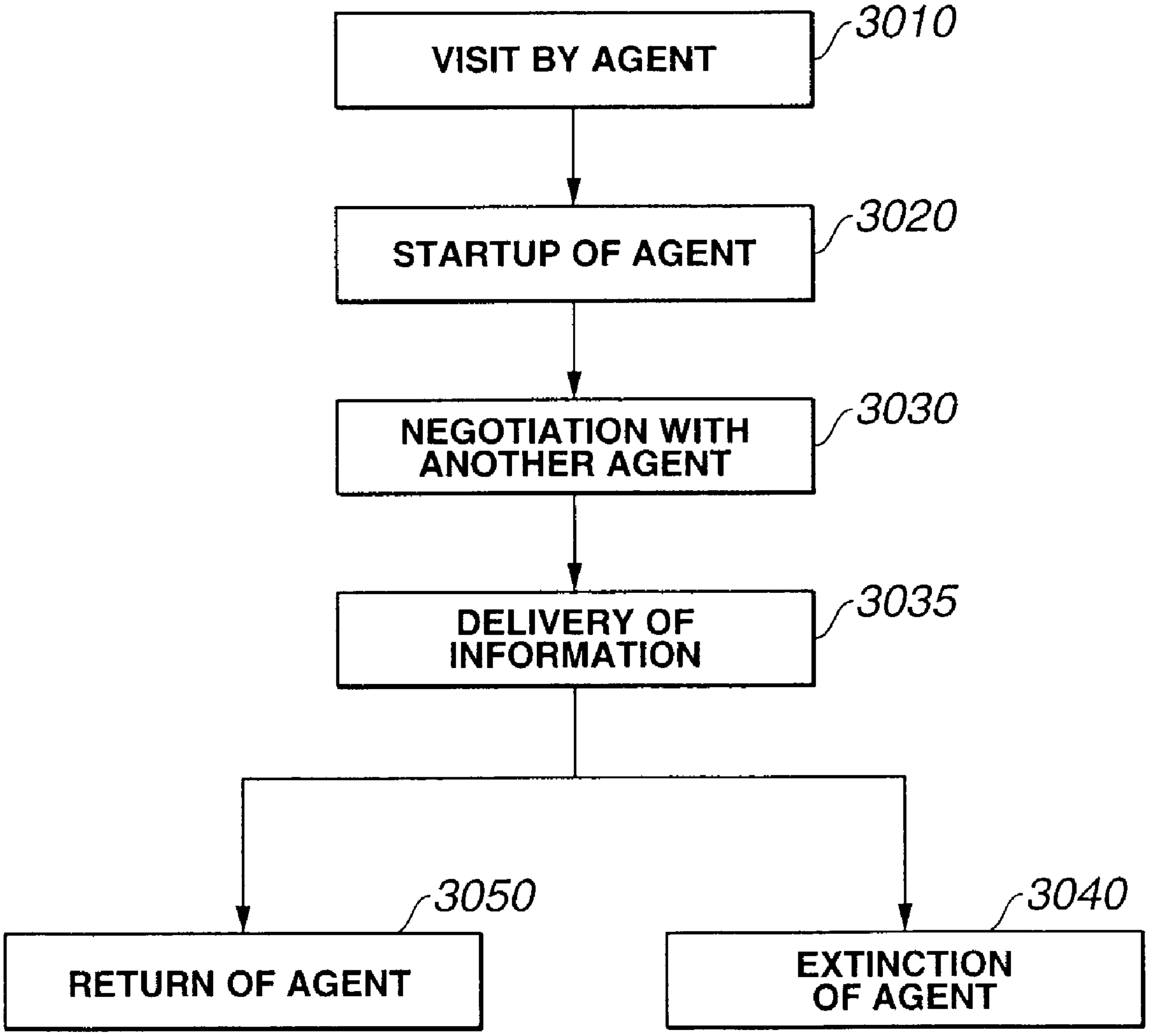
FIG. 8 is a flowchart showing a flow in the system of the embodiment according to the present invention at a remote place where the agent stays for a visit.

The traffic information collecting system according to the preceding embodiments can be realized on the basis of Java and a network based on TCP/IP, as shown in FIGS. 6, 7 and 8, respectively, showing operating flows of an agent in a home place, traffic information server and a remote place reached for a visit.

HOME FIG. 6 shows a flow at Home in this example. Home is a birthplace where an agent is created. After created, the agent operates as in the following steps.

Step 1010 (Creation): The agent is newed. To new is to secure an actual object of the agent on a memory of a computer resource at Home. In this way, the actual object of the agent is generated.

Step 1020 (Placement): The agent is placed. The placement of the agent means registration to the Office where the agent is created. Registration is to attach pointers to each other to enable reference from the office to the agent and from the agent to the office. By the placement to Home, the agent turns to the COCIERGE mode.

Step 1030 (Startup): To start the agent means startup of a thread peculiar to the agent. The agent has a thread of its own in addition to a main thread, and in that thread, the agent performs its all operations. No influence is exerted on the main thread.

Step 1040 (Input): When there is an instruction to the agent, an input phase starts. In the input phase, an appropriate dialog box is displayed. When intention is to obtain traffic information, information retrieval is performed automatically along a planned course, and hence the input phase is skipped.

Step 1050 (Search): Search is conducted for traffic information server to obtain required traffic information, by using IP address and name lookup function registered in RMI server. By indicating a machine and an office in the machine, it is possible to find a target traffic information server of the destination. As a result of the search, a handler to the Office of the destination is returned. Handler is a kind of a pointer to the Office of the destination. At Home, access to this handler provides the same effect as access to a remote Office of the destination.

Step 1060 (Departure): The agent is caused to visit the Office determined at step 1050. In visit, the agent is first padded to an object Transporter for transportation. Then, this Transporter object is passed as an argument of Visit to the Office of the destination. Java opens a stream to the Office of the destination, serializes the Transporter object and inputs the serialized object to the stream. In this case, it is necessary to send class definition of the agent because the Office of the destination have no knowledge of the type of the agent. This is achieved by using AnnotateClass method in OjectOutputStream of Java. AnnotateClass method is called automatically when the object is written in the stream. Accordingly, Class file is written to the stream, and the class definition is transferred to the destination.

Traffic Information Server FIG. 7 shows a flow of the traffic information server.

The traffic information server is a destination to which the agent is transferred from the vehicle. By the use of the name lookup function of JavaRMI, the traffic information server have the name of its own Office registered in the RMI server. The sender of the agent searches the server by the process of step 1050, and sends the agent to the server. In the traffic information server, the agent operates in the following manner.

Step 2110 (Arrival): The traffic information server takes out the agent from the stream by the function of Java, and restores the agent to the original form of the actual object. In this case, the class of the agent is also sent to the traffic information server. When the class of the agent is read, a resolveClass method is called, the reading of the class is instructed to a class loader, and a new class is registered to JavaVirtual machine. By the visit to the traffic information server, the agent turns to the AGENT mode.

Step 2015 (Startup): The restored agent starts its thread again.

Step 2026 (Query): By the thread of step 2015, the agent searches for an agent of another vehicle to which the agent is to be passed. To this end, the agent produces a query by SQL to the database in which agents of other vehicles are registered. The condition of SQL is ID of a portion of the route the vehicle of the agent is heading. As a result, the agent obtains one or more handlers of other agents in the route ahead.

Step 2030 (Clone): If a plurality of handlers for destination are obtained, the agent produces a plurality of clones of itself in number corresponding to the number of the handlers. Generation of clones is achieved by implementing Clonable interface of Java. That is, duplication is performed by calling Clone method of the agent.

Step 2040 (Stay): If no handler is found, the agent registers itself in the database array of the traffic information server, and stays in the traffic information server until the registration of another agent passing through a corresponding route section.

Step 2050 (Visit): The agent moves to another vehicle. Movement is done in the same manner as in step 1060.

Remote Place of Visit FIG. 8 shows a flow at the remote place. A remote place to which a visit is made is a kind of an agent office build on another vehicle. An agent from other vehicle is placed on this agent office and thereby the agent is put in a state capable of collecting traffic information from this office (in the vehicle in motion). In the remote place of another vehicle, the agent operates in the following manner.

Step 3010 (Visit): Visit is made in the same manner as in step 2010.

Step 3020 (Startup): A start is made by creating its own thread as in step 2020.

Step 3030 (Negotiation): After startup, the agent notifies other agents in the office, of its own arrival. This notification contains the objective of collecting traffic information. In response, the agent receives traffic information from one or more other agents in the CONCIERGE mode on the office.

Step 3035 (Information Delivery): The traffic information obtained at step 3030 is delivered to Home, by the use of message communication among agents. That is, the agent obtains a handler of Home registered in the RMI server, and transmits message packet including the traffic information directly to the handler of Home.

Step 3040 (Extinction): If the course of the vehicle on the visit receiving side deviates from the planned course, or if the life of the agent (that is, the duration set at the beginning) has expired, then the visitor agent terminates its own thread and frees the memory. Substantial freeing of the memory is done by garbage collection of Java.

Step 3050 (Return): The visitor agent may return to its home according to the original instruction without disappearing at the remote place. In this case, if the course of the vehicle on the visit receiving side deviates from the planned course, or if the life of the agent has expired, then the visitor agent returns to the home by the same process as in step 2010, and then turns to the RETIREMENT mode. The agent turned to the RETIREMENT mode terminates the thread, and frees the memory by garbage collector of the home.

The distributed information collecting systems of the illustrated embodiments have the following characteristics. (1) Information collection and information delivery are both performed in a manner of distributed system. (2) Instead of traffic information, each vehicle (corresponding to a probe car) posts an agent (agent program) holding its own state (location and planned course) in a virtual space. (3) A user utilizing this system too posts an agent of the user in the virtual space. (4) A user's agent negotiates with other agent or agents for vehicles running ahead on the same planned course. (5) Thereafter, agents for vehicles can exchange information directly between them. (6) The direct communication among vehicles decreases the amount of communication between a traffic information server and vehicles but tends to increase the amount of communication among vehicles. However, the following characteristics are effective to meet the increase in the amount of communication among vehicles. (7) An agent for a user can migrate directly into a CPU in a vehicle or each of vehicles. (8) An agent of a user collects information directly on a plurality of vehicles, and transmit, to the user, summary or occasional or sudden information in a manner of event-driven system.

The thus-constructed system according to each illustrated embodiment can lessen the burden on a server, and reduce the communication traffic. Moreover, the following effects are obtained by using autonomous agent programs. (1) When a remote vehicle reached by an agent of a user is proved to be useless for the intended purpose, the agent returns to a virtual space and searches for a new destination, without the need for user's intervention for search. The usage is simple and easy. (2) Agents visiting a probe car from separate vehicles can exchange information with one another, and can obtain information from other visiting agents about a next destination or about a vehicle without moving to that vehicle. (3) Even if a user's side turns to an off-line state, an agent for the user can continue to function properly for collecting information in a remote vehicle, and supply non-defective information properly covering the off-line period when the communication is restarted.

A mobile unit according to the present invention may be a small-sized portable or wearable unit designed to be carried by or on a person.

In the preceding embodiments, at least section 206 can serve as a communication section to be mounted in a first mobile unit, and to receive an autonomous agent program to collect information. Section 205 or CPU corresponds to a control section to be mounted in the first mobile unit, and to perform a control action in response to a request of the agent program sent from a remote mobile unit. At least one of sections 203, 303 and 304 can serve as a management section to be mounted in the first mobile unit, to allow delivery of information on a result of the control action. Device 201 can serve as a requesting section to be mounted in the first mobile unit, and to request collection of information. The management section may be designed to store an agent program as requested by the requesting section, and send out the agent program from the first mobile unit. At least one of section 001 and 002 serves as a sensing section to sense a position and a moving speed of the first mobile unit. Device 201 may serve as an input device to produce a request for collecting information for the first mobile unit in response to an operation of a user of the first mobile unit, or a device to calculate a course of the first mobile unit and to produce a request for collecting information for the first mobile unit at the time of calculating the course of the first mobile unit. Step 1010 corresponds to an agent creating section to create the agent program. Section 006 of agent program can serve as a section to gain information by negotiating with other agent programs. Section 411 serves as a server-side communicating section to accept agent programs from a plurality of mobile units. At least one of sections 401, 402, 404, 405, 406 and 409 can serve as a server-side mediating section to provide a virtual space to allow interaction among the agent programs. Section 2020 corresponds to a searching section to enable an agent program placed on the virtual space to search for another agent program on the virtual space, and a section 402 can serve as the searching section. Transfer section 012 in the server 2 may be arranged to enable an agent program to move from the virtual space to another mobile unit. Section 014 in the server 2 may be arranged to allow agent programs to interact with each other. Section. 206 corresponds to means for receiving a visiting agent program across a communication network. A CPU or section 205 can correspond to means for preparing information in response to a request of the visiting agent program. At least one of sections 203, 204, 303, 304 and 305 can serve as means for allowing the visiting agent program to deliver the information to a destination specified by the visiting agent program across the communication network. Step 3010 corresponding to receiving a visiting agent program from a remote mobile unit across a communication network. Step 3020 corresponds to allowing the visiting agent program to operate to obtain information for the remote mobile unit. Step 3035 corresponds to allowing the visiting agent program to deliver the information to a destination specified by the visiting agent program across the communication network. Step 1010 corresponds to creating an information collecting agent program to collect information for a user's mobile unit. Step 1060 corresponds to sending the information collecting agent program out of the user's mobile unit over the communication network.

This application is based on a prior Japanese Patent Application No. 2001-236589 filed in Japan on Aug. 3, 2001. The entire contents of this prior Japanese Patent Application No. 2001-236589 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A distributed information system comprising a communication section to be mounted in a first mobile unit, configured to receive an agent program which is an autonomous program to collect information, from a second mobile unit;

a control section to be mounted in the first mobile unit, configured to perform a control action in response to a request of the agent program sent form the second mobile unit;

a management section to be mounted in the first mobile unit, configured to allow delivery of information based on a result of the control action to the second mobile unit;

a server-side communicating section configured to accept agent programs from a plurality of mobile units; and a server-side mediating section configured to provide a virtual space to allow interaction among the agent programs which are autonomous programs;

wherein the server-side mediating section comprises a transfer section to enable an agent program to move from the virtual space to another mobile unit.

2. The distributed information system as claimed in claim 1, further comprises:

a requesting section to be mounted in the first mobile unit, to request collection of information;

wherein the management section stores an agent program which is an autonomous program to collect information as requested by the requesting section, and sends out the agent program from the first mobile unit.

3. The distributed information system as claimed in claim 2, wherein the distributed information system is a system mounted in the first mobile unit, and the distributed information system further comprises:

a sensing section to sense a position and a moving speed of the first mobile unit;

wherein the control section prepares information on the position and moving speed of the first mobile unit in response to the request of the agent program for the second mobile unit, and the management section allows the delivery of the information on the position and moving speed of the first mobile unit, to the second mobile unit.

4. The distributed information system as claimed in claim 2, wherein the requesting section comprises an input device to produce a request for collecting information for the first mobile unit in response to an operation of a user of the first mobile unit.

5. The distributed information system as claimed in claim 2, wherein the requesting section comprises a device to calculate a course of the first mobile unit, and to produce a request for collecting information for the first mobile unit at the time of calculating the course of the first mobile unit.

6. The distributed information system as claimed in claim 2, wherein the requesting section comprises an agent creating section to create the agent program to be sent out from the first mobile unit, the agent program sent out from the first mobile unit including an identification code for uniquely identifying the agent program.

7. The distributed information system as claimed in claim 2, the requesting section comprises an agent creating section to create the agent program which is an autonomous program including a movement section for enabling the agent program to move autonomously between the first mobile unit and another mobile unit.

8. The distributed information system as claimed in claim 2, the requesting section comprises an agent creating section to create the agent program which assumes one of three different states in accordance with a home place where the agent program is created, a current place to which the agent program currently belongs, and a previous place to which the agent program belonged before transfer to the current place.

9. The distributed information system as claimed in claim 2, the requesting section comprises an agent creating section to create the agent program comprising a section to gain information for the first mobile unit by negotiating with other agent programs.

10. The distributed information system as claimed in claim 1, wherein the distributed information system is a traffic information collecting and delivering system mounted on a vehicle.

11. The distributed information system as claimed in claim 1, wherein the server-side mediating section includes map data and provides the virtual space which is a two-dimensional space on which agent programs can be placed.

12. The distributed information system as claimed in claim 11, wherein the server-side mediating section comprises a searching section to enable an agent program placed on the virtual space to search for another agent program on the virtual space.

13. The distributed information system as claimed in claim 1, wherein the server-side mediating section comprises a negotiating section to allow agent programs to interact with each other.

14. The distributed information system as claimed in claim 1, wherein the distributed information system comprises:

a server which comprises the server-side communicating section and the server-side mediating section; and the first mobile unit which is a vehicle comprising the communication section mounted on the first mobile unit, the control section mounted on the first mobile unit and the management section mounted on the first mobile unit, and configured to send information on the result of the control action, directly to the second mobile unit without intervention of the server.

15. A distributed information collecting and delivering system comprising:

a server-side communicating section accepting agent programs which are autonomous programs, from a plurality of mobile units; and a server-side mediating section providing a virtual space on which the agent programs interact with each other;

wherein the server-side mediating section includes map data for providing the virtual space representing a two-dimensional space, and places each of the agents programs on the virtual space in accordance with information on a position of each agent program.

* * * * *